United States Patent
Liang et al.

(10) Patent No.: US 12,072,231 B1
(45) Date of Patent: Aug. 27, 2024

(54) APPARATUS AND METHOD FOR REAL-TIME IN-SITU SIMULTANEOUS MEASUREMENT OF TEMPERATURE AND MECHANICAL PARAMETERS

(71) Applicant: North University of China, Taiyuan (CN)

(72) Inventors: Xiaorui Liang, Taiyuan (CN); Qiulin Tan, Taiyuan (CN); Shuang Li, Taiyuan (CN); Dan Hu, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 18/418,520

(22) Filed: Jan. 22, 2024

(30) Foreign Application Priority Data

Mar. 7, 2023 (CN) .......................... 202310206291.9

(51) Int. Cl.
  *G01H 11/08* (2006.01)
  *G01K 7/02* (2021.01)
  *G01K 11/26* (2006.01)

(52) U.S. Cl.
  CPC ............... *G01H 11/08* (2013.01); *G01K 7/02* (2013.01); *G01K 11/265* (2013.01)

(58) Field of Classification Search
  CPC ......... G01H 11/08; G01K 7/02; G01K 11/265
  See application file for complete search history.

(56) References Cited

U.S. PATENT DOCUMENTS

| | | | |
|---|---|---|---|
| 7,318,349 B2 * | 1/2008 | Vaganov ................. | G01P 15/18 73/514.33 |
| 7,327,472 B2 * | 2/2008 | Riza ......................... | G01K 5/52 356/519 |
| 9,383,208 B2 * | 7/2016 | Mohanty ................. | H03B 5/30 |

(Continued)

OTHER PUBLICATIONS

Office Action for Chinese App. No. 202310206291.9, issued May 16, 2013.

(Continued)

*Primary Examiner* — Nathaniel T Woodward
*Assistant Examiner* — Philip L Cotey
(74) *Attorney, Agent, or Firm* — Mark T. Vogelbacker; Eckert Seamans Cherin & Mellott, LLC

(57) ABSTRACT

An apparatus and method for real-time in-situ simultaneous measurement of temperature and mechanical parameters can include a charge type vibration sensing module having a temperature compensation function and a temperature/vibration coplanarly-integrated wireless surface acoustic wave (SAW) sensing module are controlled by a processing module in which a full-range temperature-vibration composite parameter compensation decoupling method is implanted, which can detect a vibration signal in a variable temperature environment. Moreover, temperature and vibration multi-parameter testing of static components in a high-temperature, narrow and closed environment can be implemented by arranging the charge type vibration sensing module having a temperature compensation function, and the temperature/vibration coplanarly-integrated wireless SAW sensing module implements health monitoring of moving components in a high-temperature and high-rotation environment.

4 Claims, 10 Drawing Sheets

(56) References Cited

U.S. PATENT DOCUMENTS

| | | | | |
|---|---|---|---|---|
| 2003/0171691 A1* | 9/2003 | Casscells, III | ....... | A61B 5/0075 |
| | | | | 600/549 |
| 2006/0017932 A1* | 1/2006 | Riza | ......................... | G01J 5/60 |
| | | | | 374/E5.034 |
| 2010/0158071 A1* | 6/2010 | Cobianu | ............ | H03H 9/02535 |
| | | | | 374/142 |
| 2015/0117157 A1* | 4/2015 | Li | ............................ | G01K 1/00 |
| | | | | 367/189 |
| 2018/0154443 A1* | 6/2018 | Milshtein | ................. | B22F 12/41 |
| 2022/0412822 A1* | 12/2022 | Bond | ......................... | G01L 1/26 |
| 2023/0300536 A1* | 9/2023 | Deng | ....................... | H04R 7/20 |
| | | | | 381/190 |

OTHER PUBLICATIONS

Notification to Grant Patent Right for Invention for Chinese App. No. 202310206291.9, issued Jun. 1, 2023.

* cited by examiner

APPARATUS AND METHOD FOR REAL-TIME IN-SITU SIMULTANEOUS MEASUREMENT OF TEMPERATURE AND MECHANICAL PARAMETERS

CROSS-REFERENCE TO RELATED APPLICATION

This patent application claims the benefit and priority of Chinese Patent Application No. 202310206291.9, filed with the China National Intellectual Property Administration on Mar. 7, 2023, the disclosure of which is incorporated by reference herein in its entirety as part of the present application.

TECHNICAL FIELD

The present disclosure relates to the technical field of temperature and mechanical parameter detection, and in particular, to an apparatus and method for real-time in-situ simultaneous measurement of temperature and mechanical parameters.

BACKGROUND

During research of the aviation field, flight safety of aviation aircraft is a crucial link, and an aero-engine is one of the important factors that affect a flight state of aircraft. Aero-engines often operate under complex and harsh conditions of high temperature, high speed, high rotation, and the like. An aerodynamic thermal effect of high-speed friction intensifies vibration of a surface of the engine, and turbine blades are cracked or even broken, thus destroying normal operation of a device, and the temperature rises sharply, which will reduce working efficiency and measurement accuracy of the engine, or even shorten the service life of the device. Moreover, during long-term flight, wings, rudders, a metal housing or other components vibrate violently. The vibration in a high-temperature environment is very complicated, and stiffness of portions including metal components will decrease, and vibration characteristics will change. Therefore, a vibration sensor needs to detect vibration frequency, amplitude, and other technical parameters, and analyze and observe various parameters, so as to determine whether an apparatus, elements, and the like can be kept in a normal operating state.

In the prior art, research on temperature-vibration composite vibration sensors is relatively mature currently, but most of them are suitable for medium and low temperature testing occasions, and there are few studies on testing of temperature-vibration composite parameters in an environment at a temperature of 600° C. or above.

A high-temperature vibration sensor uses a piezoelectric effect of a high-temperature resistant piezoelectric material to convert an input vibration signal into an electrical signal for output. The high-temperature vibration sensor has the advantages of self power generating, high operating temperature, small volume, high reliability, and the like, and is the first choice for aero-engine vibration measurement sensors. However, in the high-temperature environment, the sensitivity of the vibration sensor changes with the increase of temperature, which affects vibration measurement accuracy and cannot truly reflect high-temperature vibration characteristics of the aero-engines.

SUMMARY

An objective of the present disclosure is to provide an apparatus and method for real-time in-situ simultaneous measurement of temperature and mechanical parameters, which can accurately monitor an operating state of an engine in real time, and can implement health monitoring of moving components in a high-temperature and high-rotation environment while implementing temperature and vibration multi-parameter testing of static components in a high-temperature, narrow and closed environment, thereby overcoming the problems of low operating temperature, large volume, difficult interconnection of high-temperature solder joints, multi-parameter interference in a composite environment, and the like existing in the prior art.

To achieve the above objective, the present disclosure provides the following solutions:

An apparatus for real-time in-situ simultaneous measurement of temperature and mechanical parameters includes a charge type vibration sensing module having a temperature compensation function, a temperature/vibration coplanarly-integrated wireless surface acoustic wave (SAW) sensing module, and a processing module, where the charge type vibration sensing module having a temperature compensation function and the temperature/vibration coplanarly-integrated wireless SAW sensing module are both connected to the processing module; and a full-range temperature-vibration composite parameter compensation decoupling method is implanted in the processing module.

Optionally, the charge type vibration sensing module having a temperature compensation function includes a charge type vibration sensor having a temperature compensation function and a plurality of thermocouples;

the thermocouples are arranged on the charge type vibration sensor having a temperature compensation function; the charge type vibration sensor having a temperature compensation function is connected to the processing module;

the charge type vibration sensor having a temperature compensation function includes a supporting base, a plurality of first mass blocks, and a plurality of piezoelectric substrates;

the supporting base includes a supporting prism and a base; the supporting prism and the base are integrally arranged;

the plurality of first mass blocks are respectively arranged on prism surfaces of the supporting prism;

the thermocouples are arranged on the first mass blocks; and the first mass blocks each are provided with a groove; a pre-tightening ring is arranged in the groove; and the pre-tightening ring fixes the piezoelectric substrate between the first mass block and the prism surface of the supporting prism.

Optionally, the first mass block is semi-cylindrical; the supporting prism is in a triangular shear shape; and a rectangular surface of the first mass block matches the prism surface of the supporting prism.

Optionally, the charge type vibration sensor having a temperature compensation function further includes a sensor housing and a sensor packaging bottom cover; and the base is fixedly arranged on the sensor packaging bottom cover; and the sensor packaging bottom cover matches and is mounted with the sensor housing.

Optionally, the thermocouple includes a Pt/Rh electrode, a Pt electrode, and a high-temperature compensation wire;

the Pt/Rh electrode and the Pt electrode are both arranged on a surface of the first mass block; the Pt/Rh electrode and the Pt electrode are both connected to the high-temperature compensation wire; the high-temperature compensation wire is connected to the processing module;

the first mass block is provided with a through hole and a hook; and the high-temperature compensation wire passes through the through hole and then is wound around the hook.

Optionally, the temperature/vibration coplanarly-integrated wireless SAW sensing module includes a temperature/vibration coplanarly-integrated SAW sensor and a packaging housing;

the temperature/vibration coplanarly-integrated SAW sensor includes a temperature sensitive unit, a pressure sensitive unit, a piezoelectric cantilever beam, a cantilever beam fixing base, and a second mass block; and one end of the piezoelectric cantilever beam is a fixed end, and the fixed end is fixed to the cantilever beam fixing base; the other end of the piezoelectric cantilever beam is a free end, and the second mass block is arranged at the free end; the temperature sensitive unit is arranged at the fixed end; the pressure sensitive unit is arranged at a position where a stress is maximum between the fixed end and the free end; and an inversely F-shaped sawtooth antenna is arranged on the packaging housing.

Optionally, the full-range temperature-vibration composite parameter compensation decoupling method includes the following steps:

determining a sensitivity of a sensing module at a temperature T based on an output variation of the sensing module and a detected vibration quantity, where the sensing module is the charge type vibration sensing module having a temperature compensation function or the temperature/vibration coplanarly-integrated wireless SAW sensing module;

determining a relative variation when the sensing module is affected only by temperature and a variation output quantity when the sensing module is affected by both temperature and vibration; and determining an output quantity of the sensing module based on the relative variation when the sensing module is affected only by temperature, the variation output quantity when the sensing module is affected by both temperature and vibration, the sensitivity, and the vibration quantity obtained by real-time monitoring.

A charge type vibration sensing module having a temperature compensation function described above is provided.

A temperature/vibration coplanarly-integrated wireless SAW sensing module described above is provided.

A full-range temperature-vibration composite parameter compensation decoupling method described above is provided.

According to specific embodiments of the present disclosure, the present disclosure has the following technical effects:

In the apparatus and method for real-time in-situ simultaneous measurement of temperature and mechanical parameters according to the present disclosure, a charge type vibration sensing module having a temperature compensation function and a temperature/vibration coplanarly-integrated wireless SAW sensing module are controlled by a processing module in which a full-range temperature-vibration composite parameter compensation decoupling method is implanted, which can detect a vibration signal in a variable temperature environment. Moreover, temperature and vibration multi-parameter testing of static components in a high-temperature, narrow and closed environment can be implemented by arranging a charge type vibration sensor having a temperature compensation function, and the temperature/vibration coplanarly-integrated wireless SAW sensing module implements health monitoring of moving components in a high-temperature and high-rotation environment, thereby overcoming the problems of low operating temperature, large volume, difficult interconnection of high-temperature solder joints, multi-parameter interference in a composite environment, and the like existing in the prior art.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DESCRIPTION OF REFERENCE SIGNS

Figure 1:
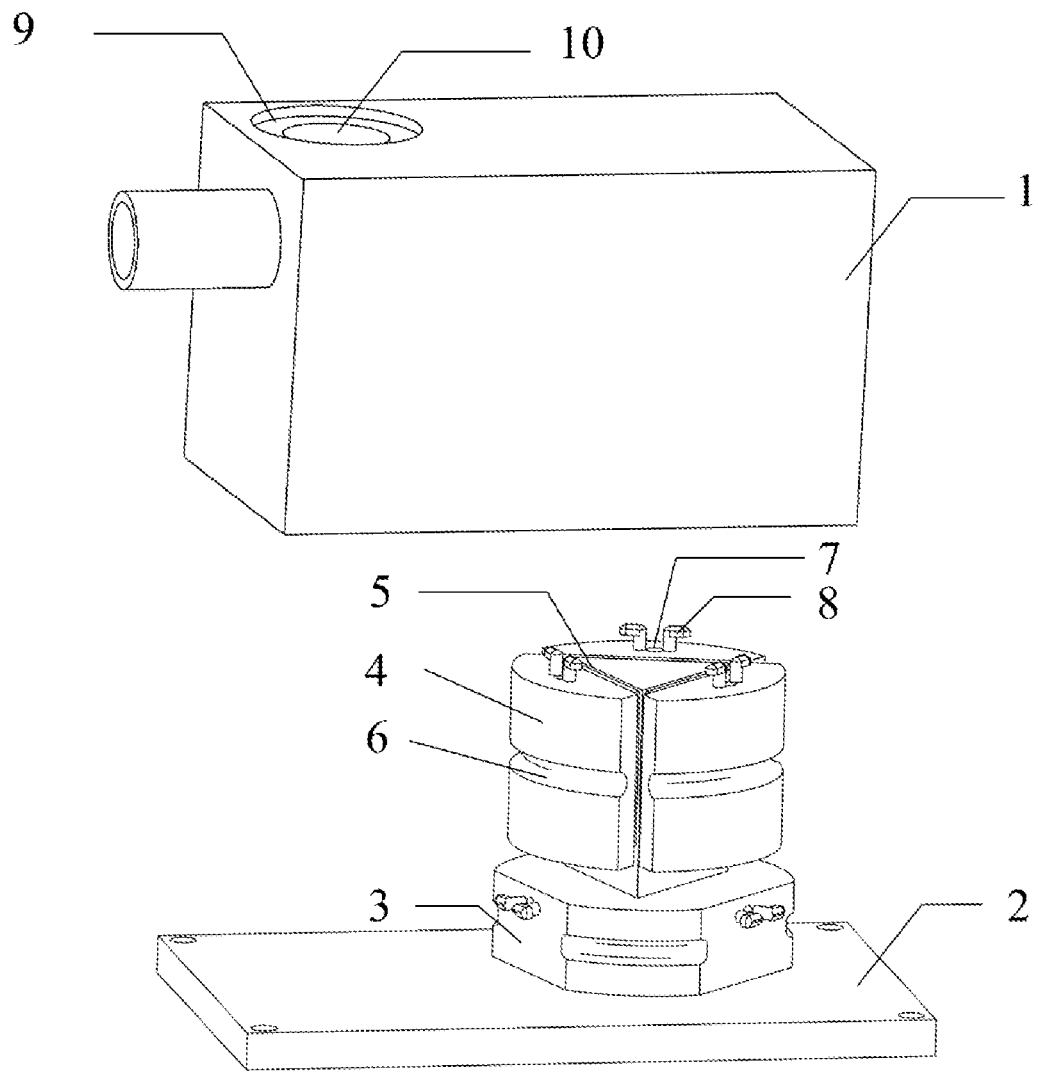
FIG. 1 is a schematic structural diagram of an apparatus for real-time in-situ simultaneous measurement of temperature and mechanical parameters according the present disclosure.

1—Sensor housing, 2—Sensor packaging bottom cover, 3—Supporting base, 4—First mass block, 5—Piezoelectric substrate, 6—Groove, 7—Through hole, 8—Hook, 9—Countersunk hole, 10—Through hole, 11—Thermocouple, 12—Pt/Rh electrode, 13—Pt electrode, 14—First electrode, 15—Second electrode, 16—Curved surface of the first mass, 17—Bolt, 18—Temperature/vibration coplanarly-integrated SAW sensor, 19—Inversely F-shaped sawtooth antenna, 20—Temperature sensitive unit, 21—Pressure sensitive unit, 22—Piezoelectric cantilever beam, 23—Cantilever beam fixing base, 24—Second mass block, 25—Packaging housing, 26—Feed port, 27—Grounding port.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide an apparatus and method for real-time in-situ simultaneous measurement of temperature and mechanical parameters, which can accurately monitor an operating state of an engine in real time, and can implement health monitoring of moving components in a high-temperature and high-rotation environment while implementing temperature and vibration multi-parameter testing of static components in a high-temperature, narrow and closed environment, thereby overcoming the problems of low operating temperature, large volume, difficult interconnection of high-temperature solder joints, multi-parameter interference in a composite environment, and the like existing in the prior art.

In order to make the above objective, features and advantages of the present disclosure clearer and more comprehensible, the present disclosure will be further described in detail below in combination with accompanying drawings and specific implementations.

An apparatus for real-time in-situ simultaneous measurement of temperature and mechanical parameters according to the present disclosure includes a charge type vibration sensing module having a temperature compensation function, a temperature/vibration coplanarly-integrated wireless SAW sensing module, and a processing module.

The charge type vibration sensing module having a temperature compensation function and the temperature/vibration coplanarly-integrated wireless SAW sensing module are both connected to the processing module.

A full-range temperature-vibration composite parameter compensation decoupling method is implanted in the processing module.

The charge type vibration sensing module having a temperature compensation function that is used in the present disclosure includes a charge type vibration sensor having a temperature compensation function and a plurality of thermocouples 11.

The thermocouples 11 are arranged on the charge type vibration sensor having a temperature compensation function. The charge type vibration sensor having a temperature compensation function is connected to the processing module.

Figure 2:
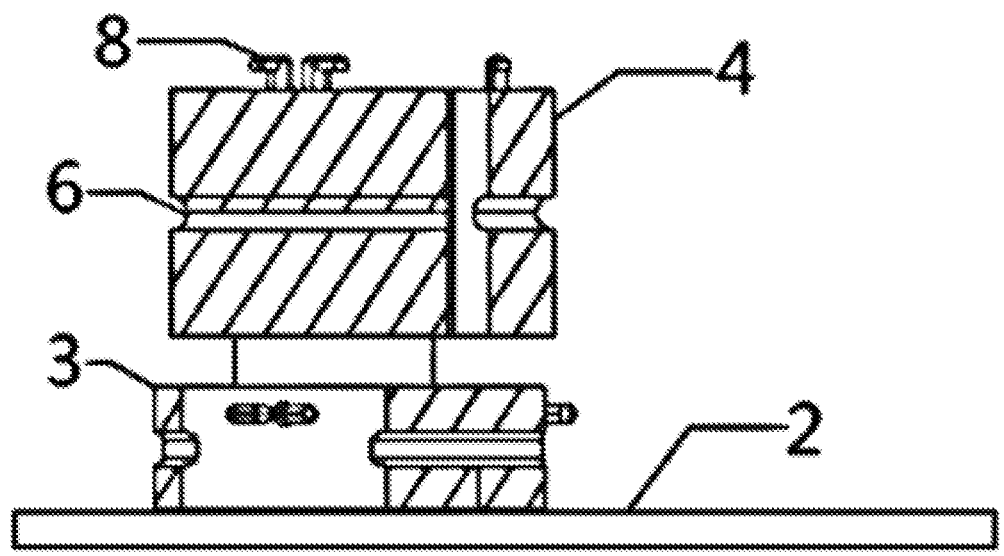
FIG. 2 is a front view of a charge type vibration sensing module having a temperature compensation function according the present disclosure.
Figure 3:
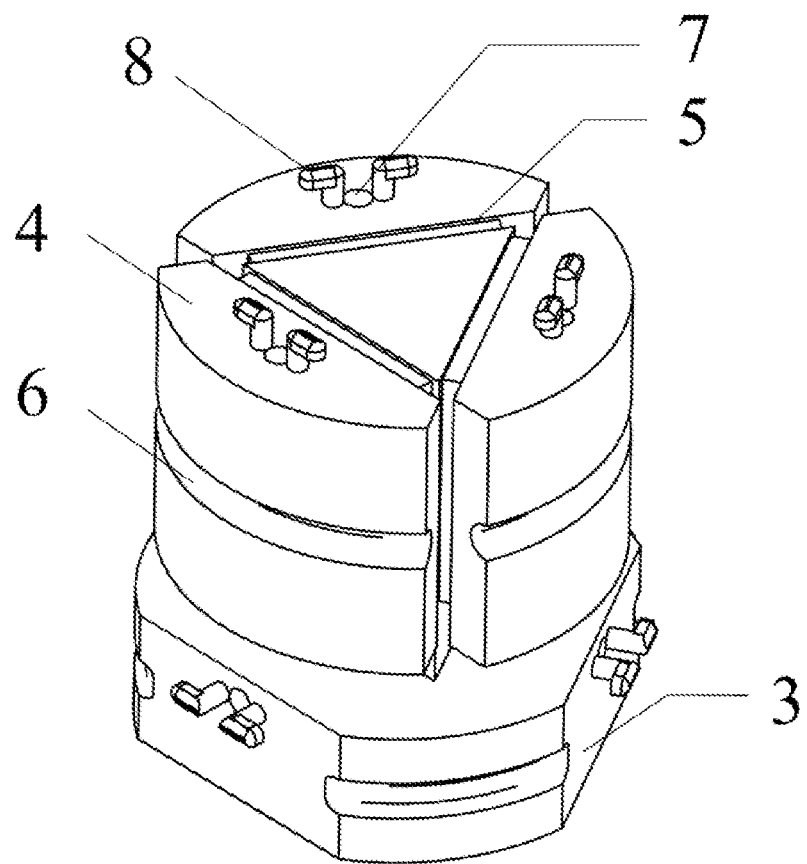
FIG. 3 is a schematic structural diagram of a charge type vibration sensor having a temperature compensation function according the present disclosure.

As shown in FIG. 1 to FIG. 3, the charge type vibration sensor having a temperature compensation function includes a supporting base 3, a plurality of first mass blocks 4, a sensor housing 1, a sensor packaging bottom cover 2, and piezoelectric substrates 5.

The supporting base 3 includes a supporting prism and a base. The supporting prism and the base are integrally arranged.

The plurality of first mass blocks 4 are respectively arranged on prism surfaces of the supporting prism. The first mass blocks 4 each are provided with a groove 6. A pre-tightening ring is arranged in the groove 6. The pre-tightening ring fixes the piezoelectric substrate 5 between the first mass block 4 and the prism surface of the supporting prism. The charge type vibration sensing module having a temperature compensation function is prepared by directly using the piezoelectric substrate 5, which not only solves the problem of mismatch of a thermal expansion coefficient, but also solves the problems of cracking, falling off, and the like of a metal electrode in an environment at a high temperature of 600° C. or above.

The thermocouples 11 are arranged on the first mass blocks 4.

The base is fixedly arranged on the sensor packaging bottom cover 2. The sensor packaging bottom cover 2 matches and is mounted with the sensor housing 1.

To improve accuracy and stability of vibration detection, according to the present disclosure, the first mass block 4 is set to be semi-cylindrical. The supporting prism is in a triangular shear shape, and has the advantages of high stability, high sensitivity, small size, and the like. A rectangular surface of the first mass block 4 matches the prism surface of the supporting prism.

Figure 4:
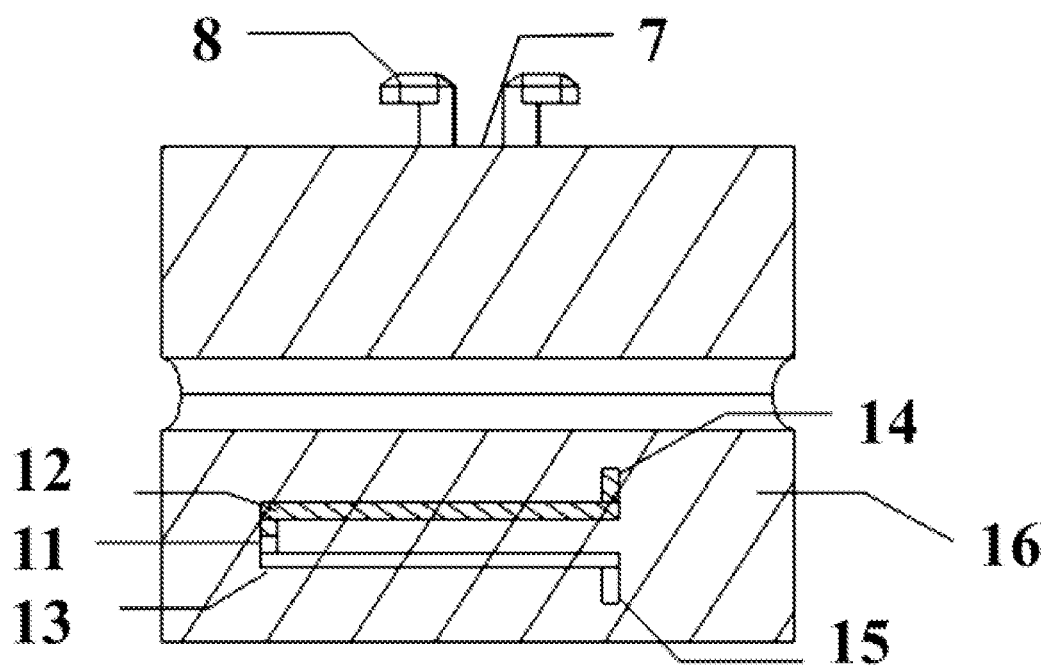
FIG. 4 is a schematic structural diagram of a first mass block and a thermocouple according to the present disclosure.

Based on the above-mentioned shape settings of the first mass block 4 and the supporting prism, in the present disclosure, the thermocouple 11 is arranged in a curved shape so as to be attached and arranged on a curved surface of the first mass block 4. Based on this, as shown in FIG. 4, the thermocouple 11 includes a Pt/Rh electrode 12, a Pt electrode 13, and a high-temperature compensation wire.

The Pt/Rh electrode 12 and the Pt electrode 13 are both arranged on a surface of the first mass block 4. The Pt/Rh electrode 12 and the Pt electrode 13 are both connected to the high-temperature compensation wire. The high-temperature compensation wire is connected to the processing module.

Figure 5:
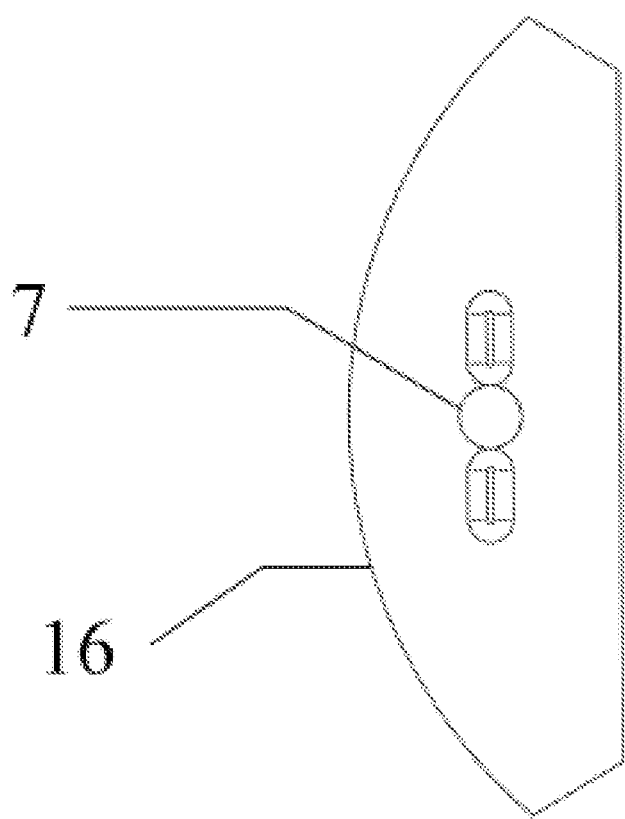
FIG. 5 is a schematic diagram showing position arrangement of a through hole and a hook on a first mass block according to the present disclosure.

Furthermore, conventional high-temperature solder joints are made of a metal paste or a high-temperature conductive adhesive, which is unstable in a high-temperature environment and may cause mismatch of the thermal expansion coefficient at a high temperature, thus affecting a test result. To solve this technical problem, as shown in FIG. 5, according to the present disclosure, the first mass block 4 is provided with a through hole 7 and a hook 8. During use, the high-temperature compensation wire is inserted into the through hole 7 of the first mass block 4, and then the back wire is wound around the hook 8 of the first mass block 4, to prevent the wire from falling off. Based on the mechanical microstructure arranged according to the present disclosure, the metal paste/high-temperature conductive adhesive can be replaced, thereby effectively solving the problem of mismatch of the thermal expansion coefficient in the high-temperature environment and improving stability of operation at a high temperature.

Further, the sensor housing 1, the supporting base 3, the first mass block 4 and the sensor packaging bottom cover 2 each are made of a high-temperature resistant metal alloy material.

Further, to reduce a use area, reduce fixed mounting procedures, and avoid damaging a mechanical structure of a tested part, in the present disclosure, the thermocouple 11 is directly deposited on a curved surface 16 of the first mass block 4 in the form of a thin film. Specifically, the method for preparing this thermocouple with a curved surface includes the following steps.

Step 1: Prepare a transition layer on the curved surface 16 of the first mass block 4 by plasma spraying, and then spray a thermal resistance layer on a surface of the transition layer by plasma spraying for many times. To solve the problem of poor insulation performance of the thermal resistance layer in a high-temperature environment, a metal oxide insulation layer is deposited on a surface of the thermal resistance layer by using a sol-gel method: drying is first performed at 150° C. for 5 minutes and then performed at 450° C. for 5 minutes, and finally annealing is performed at 600° C. for 5 minutes. This step is repeated for many times to obtain the metal oxide insulation layer to form insulating performance on the curved surface 16 of the first mass block 4.

Step 2: Form a thin film thermocouple on a curved surface by screen printing. The screen printing is performed by using a screen plate: a screen printing plate and a scraper are first wiped by using anhydrous ethanol, an alloy slice and the screen plate are fixed in the same direction, and a scraping plate moves slowly. After printing, a sieve plate is taken out, and the first mass block 4 is placed in a tube furnace at 125° C. for 15 minutes to obtain a dried Pt electrode 13. A dried Pt/Rh electrode 12 is obtained by using the same method. After printing, the first mass block 4 is kept at 1100° C. for 2 hours and naturally cooled to room temperature.

Step 3: Connect a first electrode 14 and a second electrode 15 of the thermocouple to a high-temperature resistant wire by using a high-temperature conductive adhesive.

Figure 6:
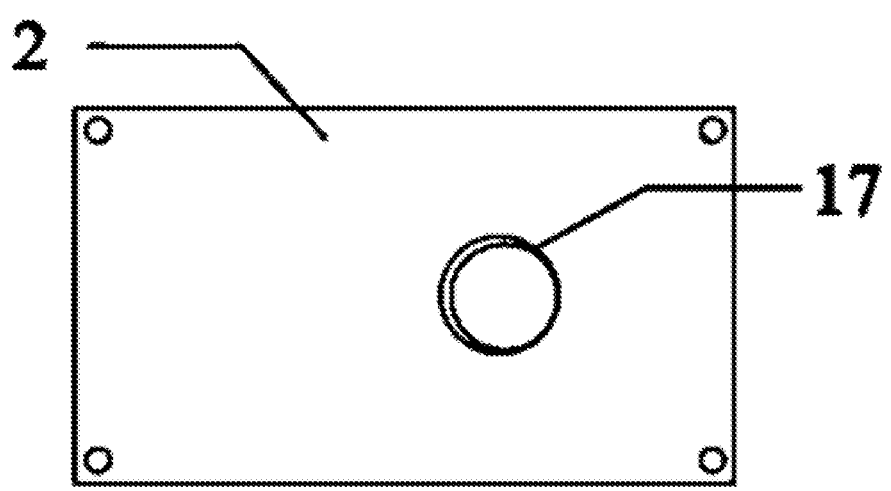
FIG. 6 is a schematic plane graph of a sensor packaging bottom cover according to the present disclosure.
Figure 7:
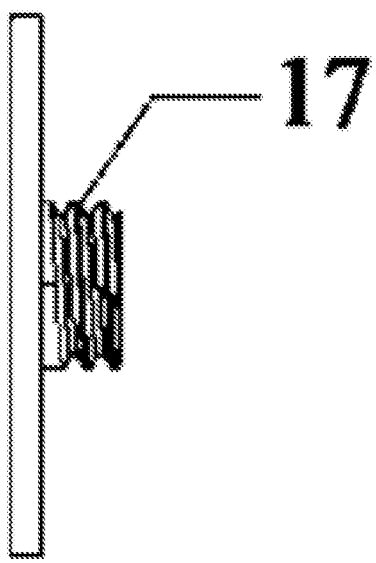
FIG. 7 is a side view of a sensor packaging bottom cover according to the present disclosure.

The charge type vibration sensing module having a temperature compensation function is fixed to the sensor packaging bottom cover 2 (as shown in FIG. 6 and FIG. 7) by a bolt 17 of M5. Then, the sensor packaging bottom cover 2 and the sensor housing 1 are mounted to form the charge type vibration sensing module having a temperature compensation function.

The charge type vibration sensing module having a temperature compensation function is fixed to a flat surface with roughness less than 0.1 mm by means of a through hole 10 and a countersunk hole 9 of a packaging housing 25.

Base on the above arrangement, the charge type vibration sensing module having a temperature compensation function used in the present disclosure has the advantages of wear resistance, pressure resistance, thermal shock resistance, and the like, and can implement vibration monitoring of static components in a high-temperature environment.

Figure 8:
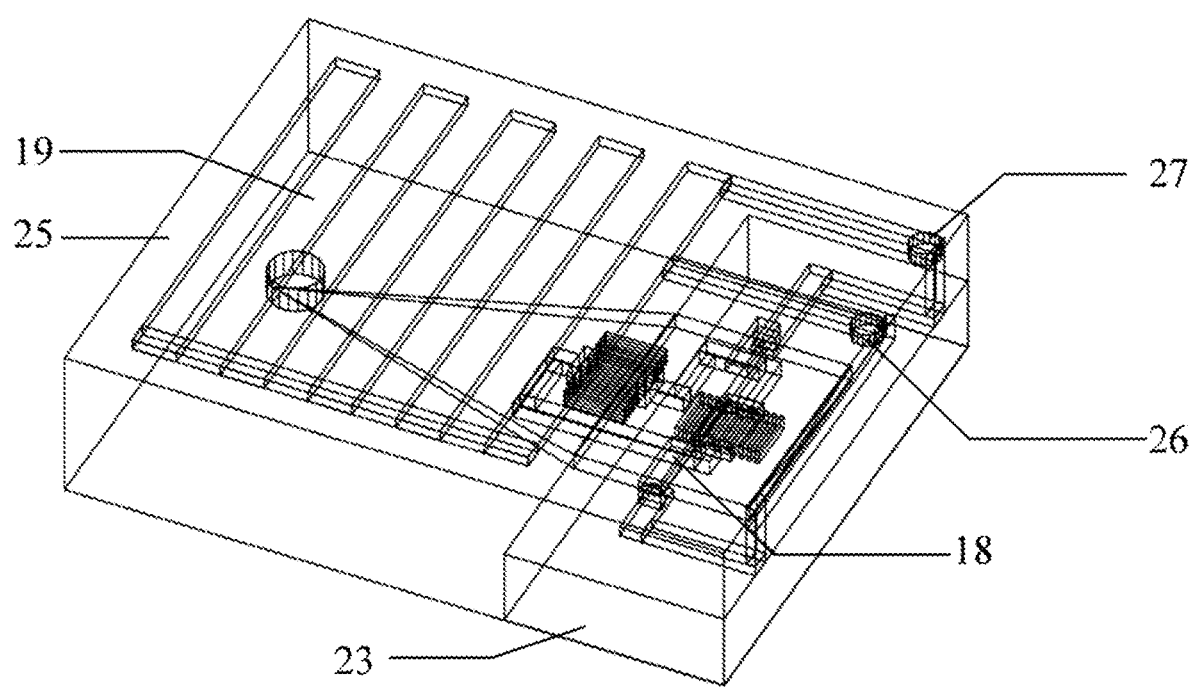
FIG. 8 is a schematic structural diagram of a temperature/vibration coplanarly-integrated wireless SAW sensing module according to the present disclosure.

Further, as shown in FIG. 8, the temperature/vibration coplanarly-integrated wireless SAW sensing module includes a temperature/vibration coplanarly-integrated SAW sensor 18 and a packaging housing 25.

Figure 9:
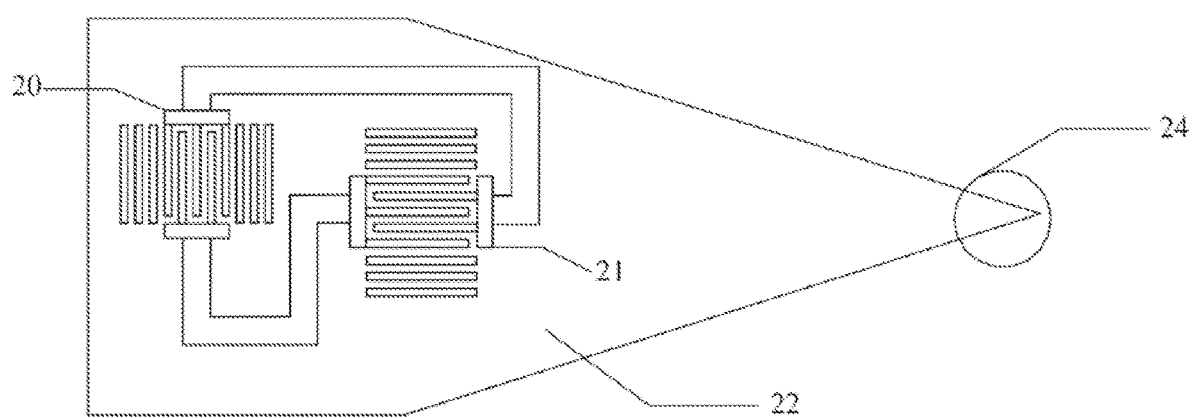
FIG. 9 is a schematic structural diagram of a temperature/vibration coplanarly-integrated SAW sensor according to the present disclosure.

As shown in FIG. 9, the temperature/vibration coplanarly-integrated SAW sensor 18 includes a temperature sensitive unit 20, a pressure sensitive unit 21, a piezoelectric cantilever beam 22, a cantilever beam fixing base 23, and a second mass block 24.

One end of the piezoelectric cantilever beam 22 is a fixed end, and the fixed end is fixed to the cantilever beam fixing base 23. The other end of the piezoelectric cantilever beam 22 is a free end, and the second mass block 24 is arranged at the free end. The temperature sensitive unit 20 is arranged at the fixed end. The pressure sensitive unit 21 is arranged at a position where a stress is maximum between the fixed end and the free end. An inversely F-shaped sawtooth antenna 19 is arranged on the packaging housing 25.

In the present disclosure, the above packaging housing 25 has an all-ceramic structure. During practical application, two through holes are formed in an upper surface of the packaging housing 25 by using a ceramic micro-assembly process, and the through holes are filled with a high-temperature conductive metal, and are used as a feed port 26 and a grounding port 27 of the inversely F-shaped sawtooth antenna 19, respectively. Two-point extreme connection between the temperature/vibration coplanarly-integrated SAW sensor 18 and the feed port 26 and the grounding port 27 is to form a connecting wire, namely the inversely F-shaped sawtooth antenna 19, on an inner wall of the ceramic packaging housing 25 by using a screen printing technology.

Based on this, compared with the prior art, the design and the preparation method of the temperature/vibration coplanarly-integrated wireless SAW sensing module according to the present disclosure greatly reduce the volume, can better facilitate wireless monitoring of moving components in a complex and narrow environment, and facilitate mass production. In addition, the inversely F-shaped sawtooth antenna 19 is connected to the temperature/vibration coplanarly-integrated SAW sensor 18 by sputtering a high-temperature resistant metal layer, which solves the problems of instability of high-temperature solder joints and mutual interference between high-temperature wires, so that the module can maintain good stability in a high-temperature environment.

Based on the above description, a preparation method of a temperature/vibration coplanarly-integrated wireless SAW sensing module according to the present disclosure includes the following steps.

Step 1: First ultrasonically clean a piezoelectric substrate 5 by using an acetone solvent and an ethanol solution, then perform spin coating (negative photoresist), photoetching and developing, and then etch a cantilever beam structure on the piezoelectric substrate 5 by using a strong acid.

Step 2: Clean an etched surface of the piezoelectric cantilever beam 22, deposit a high-temperature metal layer on the surface, perform spin coating (positive photoresist), photoetching and developing, and bombard and etch an area not covered by the photoresist by using bombarding particles by ion beam etching (IBE), so as to obtain the desired temperature/vibration coplanarly-integrated SAW sensor 18.

Step 3: Prepare an inversely F-shaped sawtooth antenna 19 on an upper surface of a packaging housing 25 by screen printing. The specific preparation method is the same as the step 3 in the preparation method of the thermocouple 11 with a curved surface.

Compared with the prior art, the above arrangement can greatly reduce the volume of the temperature/vibration coplanarly-integrated wireless SAW sensing module, facilitate wireless monitoring of moving components in a complex and narrow environment, and facilitate mass production. In addition, the antenna is connected to the sensor by sputtering the high-temperature resistant metal layer, which solves the problems of instability of high-temperature solder joints and mutual interference between high-temperature wires, so that the temperature/vibration coplanarly-integrated wireless SAW sensing module can maintain good stability in a high-temperature environment.

In the charge type vibration sensing module having a temperature compensation function and the temperature/vibration coplanarly-integrated wireless SAW sensing module described above, the temperature affects temperature and vibration sensors, and temperature drift of each sensor is greater than a change caused by the vibration of the sensor within the range. Therefore, during application of an actual temperature-vibration composite environment, it is necessary to perform a temperature compensation decoupling algorithm on the two sensors to ensure the obtaining of an accurate vibration signal in a variable temperature environment.

Based on this, a full-range temperature-vibration composite parameter compensation decoupling method implanted in the processing module in the present disclosure includes the following steps:
- determining a sensitivity of a sensing module at a temperature T based on an output variation of the sensing module and a detected vibration quantity, where the sensing module is the charge type vibration sensing module having a temperature compensation function or the temperature/vibration coplanarly-integrated wireless SAW sensing module;
- determining a relative variation when the sensing module is affected only by temperature and a variation output quantity when the sensing module is affected by both temperature and vibration; and
- determining an output quantity of the sensing module based on the relative variation when the sensing module is affected only by temperature, the variation output quantity when the sensing module is affected by both temperature and vibration, the sensitivity, and the vibration quantity obtained by real-time monitoring.

Specifically, a thermal-vibration influence characteristic curve is analyzed, and a common thermal-vibration coupling measurement model and decoupling algorithm applicable to the above two sensing modules in a high-temperature environment are established as follows:

a temperature coefficient is: $(\Delta k/\Delta T)/k$, where k is a reaction rate constant related to a biological process, T is the temperature, $\Delta k$ is a variation of the reaction rate constant related to the biological process, and $\Delta T$ is a temperature variation.

A sensitivity $S_T$ of the sensing module at a temperature may be expressed as:

$$S_T = \frac{\Delta C_v^T}{v},$$

where $\Delta C_v^T$ is the output variation of the sensing module when the temperature is T and the vibration is v.

When the sensing module is affected only by temperature, the relative variation of the sensing module may be expressed as shown in the following formula:

$$\frac{\Delta C_{v=0}^T}{C_{v=0}^{T_0}} = \frac{C_{v=0}^T - C_{v=0}^{T_0}}{C_{v=0}^{T_0}} = \left(\frac{\Delta k}{\Delta T}\right)/k, \quad (1)$$

where $$C_{v=0}^{T_0}$$

represents a reference vibration quantity of the sensing module at normal temperature without vibration, and $$\Delta C_{v=0}^T$$

represents a reference vibration variation of the sensing module at normal temperature without vibration. When the sensing module is affected by both temperature and vibration, a relative sensor output quantity variation may be expressed as:

$$\frac{\Delta C_{v=0}^T}{C_{v=0}^{T_0}} = \frac{C_{v=0}^T - C_{v=0}^{T_0}}{C_{v=0}^{T_0}} = \quad (2)$$

$$\frac{C_v^T - C_{v=0}^T + C_{v=0}^T - C_{v=0}^{T_0}}{C_{v=0}^{T_0}} = \frac{\Delta C_v^T + \Delta C_{v=0}^T}{C_{v=0}^{T_0}} = \frac{S_T \times v}{C_{v=0}^{T_0}} + \left(\frac{\Delta k}{\Delta T}\right)/k,$$

where $C_v^T$ is the output quantity of the sensing module when the temperature is T and the CT vibration is v.

When the sensing module is affected only by vibration, a sensor output quantity variation may be obtained by subtracting formula (1) from formula (2), and is expressed as:

$$\frac{\Delta C_{v,T}}{C_{v=0}^{T_0}} - \frac{\Delta C_{v=0}^T}{C_{v=0}^{T_0}} = \frac{S_T \times v}{C_{v=0}^{T_0}}. \quad (3)$$

In formula (1) and formula (2), based on the same transformed quantity of the temperature coefficient $(\Delta k/\Delta T)/k$, the sensor output quantity is obtained as C:

$$C = C_v^T + C_{v=0}^{T_0} = S_T \times v + C_{v=0}^{T_0} + C_{v=0}^{T_0}. \quad (4)$$

Therefore, the vibration quantity of the sensing module after compensation decoupling is v'.

$$v' = \frac{C - \Delta C_{v=0}^{T_0} - C_{v=0}^{T_0}}{S_T}.$$

Figure 10:
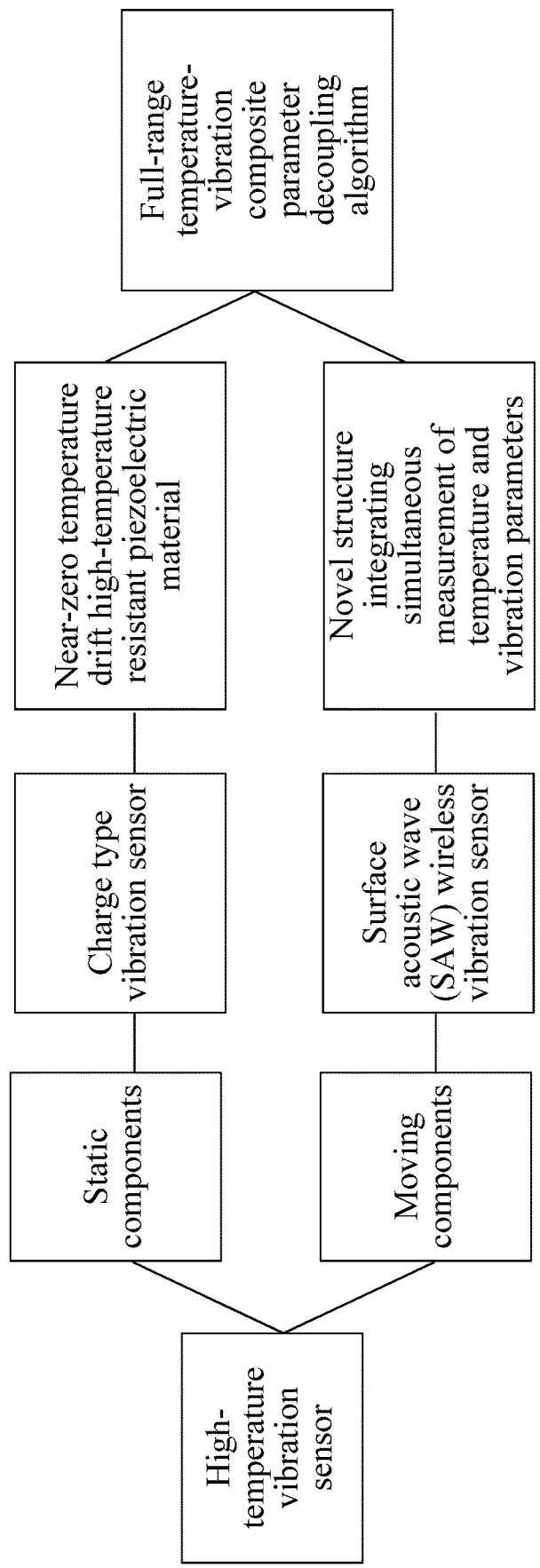
FIG. 10 is a technical roadmap for application of a full-range temperature-vibration composite parameter compensation decoupling method according to the present disclosure.

Based on the above description, a technical route of applying the full-range temperature-vibration composite parameter compensation decoupling method to the above apparatus for real-time in-situ simultaneous measurement of temperature and mechanical parameters is shown in FIG. 10.

The above-mentioned temperature compensation decoupling method is suitable for a case where the influence of temperature on a device is monotonic. This method has flexible applicability and enables the sensor to be used in a complex environment.

In addition, the charge type vibration sensing module having a temperature compensation function, the temperature/vibration coplanarly-integrated wireless SAW sensing module and the full-range temperature-vibration composite parameter compensation decoupling method according to the present disclosure can all be used as independent parts.

During adaptation, the full-range temperature-vibration composite parameter compensation decoupling method may be converted into a computer program to be implanted into a memory. The computer program in the memory may be stored in a computer-readable storage medium when the computer program is implemented in the form of a software functional unit and is sold or used as an independent product. Based on such understanding, the technical solutions of the present disclosure essentially or the part contributing to the prior art may be implemented in a form of a software product. The computer software product is stored in a storage medium, and includes several instructions for enabling a computer device (which may be a personal computer, a server, a network device, or the like) to perform all or some steps of the methods described in the embodiments of the present disclosure. The above storage medium includes any medium that may store program code, including a USB flash drive, a mobile hard disk, a read-only memory, a random access memory, a magnetic disk, an optical disc, or the like.

Embodiments of this description are described in a progressive manner, each embodiment focuses on the difference from other embodiments, and for the same and similar parts between the embodiments, reference may be made to each other.

Specific examples are used herein for illustration of principles and implementations of the present disclosure. The descriptions of the above embodiments are merely used for assisting in understanding the method of the present disclosure and its core ideas. In addition, those of ordinary skill in the art can make various changes in terms of specific implementations and the scope of application in accordance with the ideas of the present disclosure. In conclusion, the content of this description shall not be construed as limitations to the present disclosure.

What is claimed is:

1. An apparatus for real-time in-situ simultaneous measurement of temperature and mechanical parameters, comprising a charge type vibration sensing module comprising a charge type vibration sensor having a temperature compensation function and a plurality of thermocouples, a temperature/vibration coplanarly-integrated wireless surface acoustic wave (SAW) sensing module comprising a temperature/vibration coplanarly-integrated SAW sensor and a packaging housing, and a processor, wherein the charge type vibration sensing module and the temperature/vibration coplanarly-integrated wireless SAW sensing module are both connected to the processor; and the thermocouples are arranged on the charge type vibration sensor having a temperature compensation function; the charge type vibration sensor having a temperature compensation function is connected to the processor;

the charge type vibration sensor having a temperature compensation function comprises a supporting base, a plurality of first mass blocks, and a plurality of piezoelectric substrates;

the supporting base comprises a supporting prism and a base; and the supporting prism and the base are integrally arranged;

the plurality of first mass blocks are respectively arranged on prism surfaces of the supporting prism;

the thermocouples are arranged on the first mass blocks;

the first mass blocks each are provided with a groove; a pre-tightening ring is arranged in the groove; and the pre-tightening ring fixes the piezoelectric substrate between the first mass block and the prism surface of the supporting prism;

the temperature/vibration coplanarly-integrated wireless SAW sensing module comprises a temperature/vibration coplanarly-integrated SAW sensor and a packaging housing;

the temperature/vibration coplanarly-integrated SAW sensor comprises a temperature sensor, a pressure sensor, a piezoelectric cantilever beam, a cantilever beam fixing base, and a second mass block;

one end of the piezoelectric cantilever beam is a fixed end, and the fixed end is fixed to the cantilever beam fixing base; the other end of the piezoelectric cantilever beam is a free end, and the second mass block is arranged at the free end; the temperature sensor is arranged at the fixed end; the pressure sensor is arranged at a position where a stress is maximum between the fixed end and the free end; and an inversely F-shaped sawtooth antenna is arranged on the packaging housing; and the processor is configured to execute operations comprising:

determining a sensitivity of the charge type vibration sensing module or the temperature/vibration coplanarly-integrated wireless SAW sensing module at a temperature T based on an output variation of the charge type vibration sensing module or the temperature/vibration coplanarly-integrated wireless SAW sensing module and a detected vibration quantity;

determining a relative variation when the charge type vibration sensing module or the temperature/vibration coplanarly-integrated wireless SAW sensing module is affected only by temperature and a variation output quantity when the charge type vibration sensing module or the temperature/vibration coplanarly-integrated wireless SAW sensing module is affected by both temperature and vibration; and determining an output quantity of the charge type vibration sensing module or the temperature/vibration coplanarly-integrated wireless SAW sensing module based on the relative variation when the charge type vibration sensing module or the temperature/vibration coplanarly-integrated wireless SAW sensing module is affected only by temperature, the variation output quantity when the charge type vibration sensing module or the temperature/vibration coplanarly-integrated wireless SAW sensing module is affected by both temperature and vibration, the sensitivity, and the vibration quantity obtained by real-time monitoring.

2. The apparatus for real-time in-situ simultaneous measurement of temperature and mechanical parameters according to claim 1, wherein the first mass block is semi-cylindrical; the supporting prism is in a triangular shear shape; and a rectangular surface of the first mass block matches the prism surface of the supporting prism.

3. The apparatus for real-time in-situ simultaneous measurement of temperature and mechanical parameters according to claim 1, wherein the charge type vibration sensor having a temperature compensation function further comprises a sensor housing and a sensor packaging bottom cover; and the base is fixedly arranged on the sensor packaging bottom cover; and the sensor packaging bottom cover matches and is mounted with the sensor housing.

4. The apparatus for real-time in-situ simultaneous measurement of temperature and mechanical parameters according to claim 1, wherein the thermocouple comprises a Pt/Rh electrode, a Pt electrode, and a high-temperature compensation wire;

the Pt/Rh electrode and the Pt electrode are both arranged on a surface of the first mass block; the Pt/Rh electrode and the Pt electrode are both connected to the high-temperature compensation wire; and the high-temperature compensation wire is connected to the processor;

the first mass block is provided with a through hole and a hook; and the high-temperature compensation wire passes through the through hole and then is wound around the hook.

* * * * *